US005948294A

United States Patent [19]

Gordon

[11] Patent Number: 5,948,294

[45] Date of Patent: Sep. 7, 1999

[54] DEVICE FOR CATHODIC CLEANING OF WIRE

[75] Inventor: Stephen S. Gordon, Plain Township, Stark County, Ohio

[73] Assignee: McDermott Technology, Inc., New Orleans, La.

[21] Appl. No.: 08/706,124

[22] Filed: Aug. 30, 1996

[51] Int. Cl.[6] .......... B23K 9/08

[52] U.S. Cl. .......... 219/123; 219/155

[58] Field of Search .......... 219/123, 136, 219/137 R, 155

[56] References Cited

U.S. PATENT DOCUMENTS

| | | | |
|---|---|---|---|
| Re. 34,806 | 12/1994 | Cann . | |
| 1,803,691 | 5/1931 | Brockway . | |
| 2,743,342 | 4/1956 | Bettis et al. | 219/123 |
| 3,146,336 | 8/1964 | Whitacre | 219/155 |
| 3,204,080 | 8/1965 | Spencer | 219/155 |
| 3,211,886 | 10/1965 | Barkan et al. | 219/123 |
| 3,352,997 | 11/1967 | Butler | 219/123 |
| 3,386,909 | 6/1968 | Hough . | |
| 3,522,162 | 7/1970 | Davies . | |
| 3,658,673 | 4/1972 | Kugler et al. . | |
| 4,935,115 | 6/1990 | Chambaere et al. . | |
| 5,354,963 | 10/1994 | Muller et al. | 219/123 |

FOREIGN PATENT DOCUMENTS

| | | | |
|---|---|---|---|
| 55-128392 | 10/1980 | Japan | 219/137 R |

*Primary Examiner*—Clifford C. Shaw
*Attorney, Agent, or Firm*—R. J. Edwards; Eric Marich

[57] ABSTRACT

A wire cleaner having a chamber and containing an arc ring for passing a wire therethrough, such that when the wire and arc ring are provided with opposite electrical potentials, an electric arc discharge occurs from the wire to the arc ring which carries off impurities from the surface of the wire. An inert gas is used to purge the chamber to prevent oxidation of the wire during and following the discharge from the wire. A pair of annular permanent magnets are positioned around the wire on each side of the arc ring to produce a magnetic field parallel to the wire which interacts with the electrical arc discharge and causes the arc to rotate around the circumferences of the wire and arc ring, thereby cleaning the entire wire. A second embodiment is provided in which the pair of permanent annular magnets is replaced by a variable strength electromagnet surrounding the arc ring and wire path.

11 Claims, 2 Drawing Sheets

DEVICE FOR CATHODIC CLEANING OF WIRE

FIELD AND BACKGROUND OF THE INVENTION

The present invention relates in general to apparatus for cleaning wires, and in particular to a wire cleaner using electric current to cathodically remove impurities from an elongated wire workpiece, such as welding wire.

Cathodic cleaning is commonly used to clean aluminum or superalloy workpieces prior to and during welding processes. In cathodic cleaning, an electric arc is established between the workpiece surface and an electrode, causing electrons to be emitted from the workpiece surface (i.e., the workpiece is the cathode, hence the name "cathodic" cleaning). The electron emission from the workpiece removes contaminants from the workpiece surface, thereby cleaning it of impurities. However, there are no known devices for continuously cathodically cleaning elongated lengths of welding wire prior to or during a welding process.

Magnetic fields are often used to affect an electric discharge, such as a welding arc, to cause the arc to rotate during a welding process. The welding arc is subjected to a stationary or moving, external magnetic field. One application of this method is the Magnetically Impelled Arc Butt (MIAB) welding process.

A cold sputter type of wire cleaner is disclosed in U.S. Pat. No. 4,935,115, in which a "long metal substrate" is continuously fed through a sputtering chamber vacuum, where a high electric potential between the substrate and an anode causes inert gas ions to bombard the substrate. The sputtering action of the inert gas ions cleans impurities from the wire; it does not form an arc to clean the wire. Because this device requires a vacuum to operate, long segments of wire must be fed through seals in the sputtering chamber to maintain the vacuum.

Other known wire cleaners use mechanical or chemical processes to clean welding wires. These processes are relatively time consuming, cumbersome, or inefficient. Common examples of the former processes include abrasive contact with the wire, while examples of the latter involve submersion of the wire in an acid or solvent bath to remove contaminants from the surface of the wire.

It is thus clear that an apparatus which could provide high speed cleaning of welding and other wires just prior to use, and which would not require a vacuum environment or chemical solutions of acids or other solvents, would be welcomed by the industry.

SUMMARY OF THE INVENTION

It is a primary objective of the present invention to provide a new effective and relatively simple wire cleaner for removing impurities from the wire surface. Another objective of the present invention is to provide a wire cleaner which can rapidly and continuously clean a wire without allowing it to be re-contaminated.

Accordingly, one aspect of the present invention is drawn to a wire cleaner having a chamber and containing an annular arc ring for drawing a wire therethrough, such that when the wire and arc ring are provided with opposite potentials, an electric arc discharge occurs from the wire to the arc ring which carries off impurities from the surface of the wire. An inert gas is used to purge the chamber to prevent oxidation of the wire during and following the discharge from the wire. A pair of annular permanent magnets are positioned around the wire on each side of the arc ring to produce a magnetic field parallel to the wire. The magnetic field interacts with the electrical arc discharge and causes the arc to rotate around the circumference of the wire and arc ring, thereby cleaning the entire wire surface.

A second embodiment of the present invention replaces the pair of permanent magnets with a single, variable strength electromagnet surrounding the arc ring and wire path.

The various features of novelty which characterize the invention are pointed out with particularity in the claims annexed to and forming a part of this disclosure. For a better understanding of the invention, its operating advantages and specific results attained by its uses, reference is made to the accompanying drawings and descriptive matter in which preferred embodiments of the invention are illustrated.

DETAILED DESCRIPTION OF THE PREFERRED EMBODIMENTS

Figure 1:
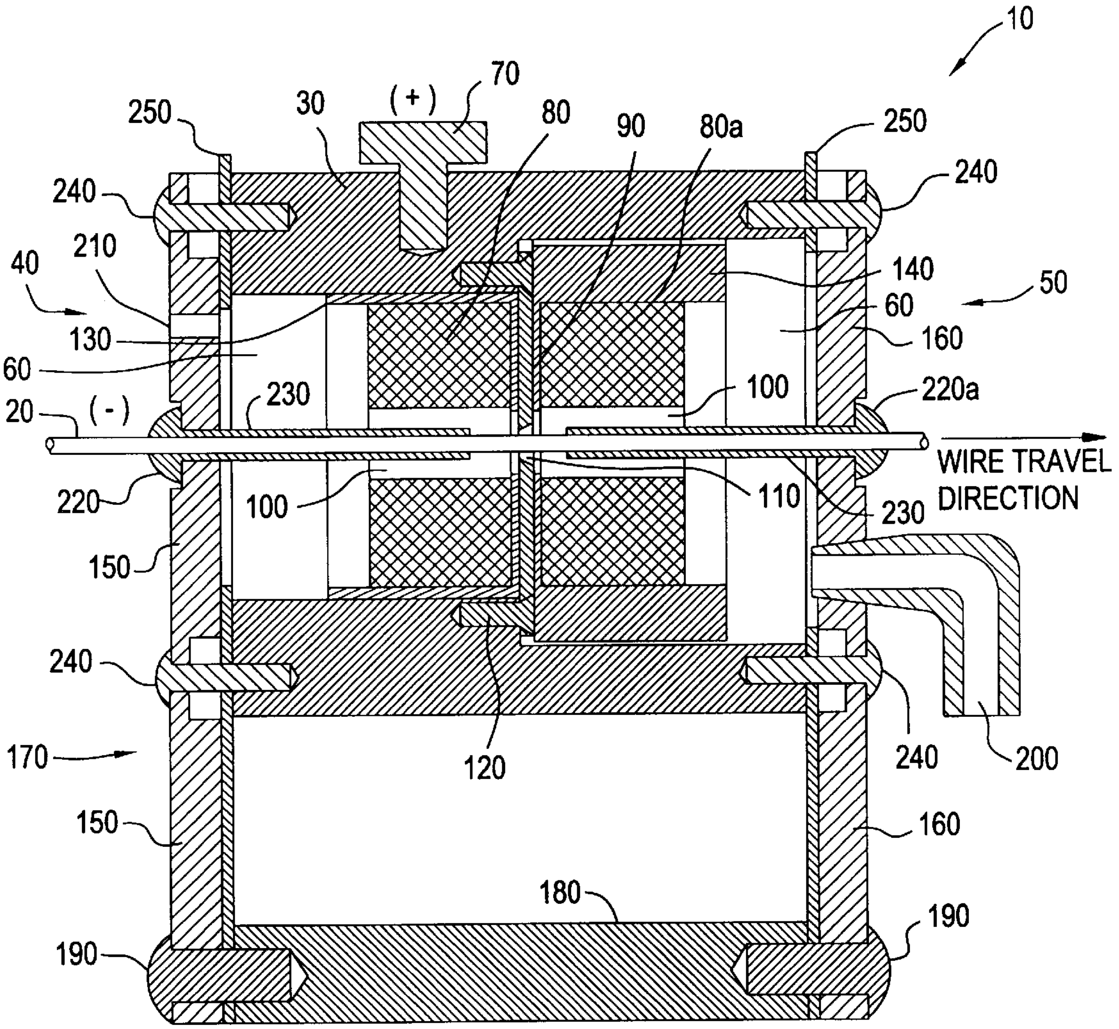
FIG. 1 is a sectional side elevation of a cathodic wire cleaner according to the invention.

Referring to the drawings generally, wherein like numerals designate the same or functionally similar elements throughout the several drawings, and to FIG. 1 in particular, there is shown a first embodiment of the wire cleaner of the present invention, generally designated 10. As shown in FIG. 1, wire cleaner 10 illustrates an elongated wire 20 extending therethrough and in position to be cleaned. The wire cleaner 10 has an elongated, substantially cylindrical, hollow housing 30 advantageously made of an electrically and thermally conductive material such as copper. Housing 30 has a first end 40 which would receive the elongated wire 20 via known feeding means (such as the wire feeding mechanism of a welding apparatus, not shown) and a second end 50 from which the elongated wire 20 exits once it has been cleaned. Housing 30 is hollow, and defines a central cleaning chamber 60. To provide a means for electrically connecting the housing 30 to a source of electrical current, an anode (+with respect to electron current flow) connection, such as bolt or screw 70 is located on an exterior surface of the housing 30.

Permanent magnet means, 80, 80*a*, are provided, advantageously in the form of a pair of hollow annular permanent magnets. The pair of permanent magnets are advantageously made of ALNICO 5 material, their poles arranged in an N-S-N-S or S-N-S-N arrangement. An annular arc ring 90 advantageously made of copper, is located between permanent magnets 80, 80*a*, and the permanent magnets 80, 80*a* and annular arc ring 90 are all located within the central cleaning chamber 60. Each permanent magnet 80, 80*a* has a substantially cylindrical central aperture 100 through which the elongated wire 20 can pass; likewise, the copper annular arc ring 90 also has a substantially cylindrical hole 110, coaxially aligned with apertures 100, through which the elongated wire 20 passes. The diameter of the hole 110 is selected to be slightly larger than the diameter of the elongated wire 20 traveling therethrough so that the latter can pass through the hole 110 without touching annular arc ring 90. Copper annular arc ring 90 is electrically connected to housing 30 by being in direct contact therewith, and is advantageously secured thereto by one or more bolts or screws 120.

While the copper annular arc ring 90 is in direct, electrical communication with the housing 30, the permanent magnets 80, 80*a* are not. Instead, permanent magnet 80 is located within an electrically insulating cup 130, advantageously made of Teflon®, nylon, or similar material. Insulating cup 130 lines the outer circumference of the permanent magnet 80, and also separates the permanent magnet 80 from one face of the adjacent annular arc ring 90. Similarly, permanent magnet 80*a* is located within an electrically insulating cup 140, also advantageously made of Teflon®, nylon, or similar material, which lines the outer circumference of the permanent magnet 80*a*, and also separates the permanent magnet 80*a* from the opposite face of the adjacent annular arc ring 90. The insulating cups 130, 140 preferably extend beyond the ends of permanent magnets 80, 80*a*, respectively, to prevent possible arcing between them and the housing 30. Similarly, the central apertures 100 in each of the permanent magnets 80, 80*a* are provided with a diameter large enough to prevent arcing between them and the wire guides, described infra.

Side covers 150, 160 are provided on each of the first and second ends 40, 50, respectively of the housing 30 and serve to close off the central cleaning chamber 60 from the outside environment. Side covers 150, 160 also extend beyond the outer surface of housing 30 at one side 170 and are connected to a base support plate 180, advantageously made of aluminum, which is positioned between the side covers 150, 160 and secured thereto by electrically conducting fasteners, such as steel screws or bolts 190. Side cover 160 is advantageously provided with an inert gas inlet 200 in fluidic communication with central cleaning chamber 60. The gas inlet 200 may advantageously be provided as a commercially available fitting for connecting to a source (not shown) of inert gas, such as argon. The other side cover 150 is correspondingly provided with an inert gas outlet 210, also in fluidic communication with central cleaning chamber 60, which provides an outlet for the inert gas and any contaminants contained therein which occur as a result of the cleaning of the elongated wire 20. It will be noted that the direction of travel of the elongated wire 20 and of the inert gas flow through the wire cleaner 10 have been shown in the drawings as being in opposite directions. This is preferred so that the inert gas flow can carry any contaminants removed from the wire 20 out of the wire cleaner 10 without recontaminating the cleaned elongated wire 20 exiting from the right hand side of FIG. 1.

Elongated wire 20 is provided into the central cleaning chamber 60 via a wire guide 220 having a central aperture 230 therein which is coaxially aligned with the central apertures 100 of permanent magnets 80, 80*a* and the hole 110 in annular arc ring 90. The wire guide 220 is mounted through and supported by side cover 150 located on the first side 40 of the wire cleaner 10 (on the left-hand side of FIG. 1), and through the central aperture 100 of permanent magnet 80 towards the annular arc ring 90. Wire guide 220 does not touch annular arc ring 80, however, and is spaced therefrom by a distance sufficient to prevent arcing therebetween. The elongated wire 20 passes through and is supported by the wire guide 220 for a portion of the length of the central aperture 100 of permanent magnet 80, and then is unsupported for a short distance until after it passes through the hole 110 in annular arc ring 90. After passing through the hole 110 in annular arc ring 90, the elongated wire 20 is still unsupported and does not make any physical contact with the structure of the wire cleaner 10 until it enters an end of a second wire guide 220*a* which is mounted through and supported by side cover 160 on the second side 50 of wire cleaner 10. Wire guide 220*a* also extends towards but does not touch the annular arc ring 90, and serves to guide and support the elongated wire 20 out of the wire cleaner 10 after the wire 20 has been cleaned. Both wire guides 220, 220*a* are advantageously made of a soft, electrically conductive material such as brass which would not cause any noticeable wear on the elongated wire 20 as it passes into and out of wire cleaner 10. In the embodiment of FIG. 1, side covers 150, 160 are also made of electrically conductive material, such as copper, but they are secured to the ends of the housing 30 in an electrically insulated fashion by virtue of insulating screw fasteners 240 (advantageously nylon) and insulating gasket materials 250 (advantageously Micarta or similar material).

During operation of the FIG. 1 embodiment, wire cleaner 10 is electrically connected to a welding power supply ground clamp (set as the negative lead, and not shown) at the base plate 180, or to either of side plates 150, 160. Since base plate 180 is also electrically connected to the wire guides 220, 220*a*, elongated wire 20 in physical contact therewith is also in electrical contact with side plates 150, 160. The wire 20 is thus the cathode (–) electrode. A welding power supply positive lead (not shown) is connected to the housing 30 at anode bolt 70. When the electrical connections are energized, electrons flow from the base plate 180 or side plates 150, 160 into wire guide 220 to the elongated wire 20, where an electric arc forms between the wire 20 and the annular arc ring 90. The gap between the annular arc ring 90 and the surface of the elongated wire 20 is preferably about 0.025 to 0.030 inches. After jumping the gap, the electrons subsequently travel from annular arc ring 90 through housing 30 to the positive lead at anode bolt 70.

While the arc is being generated, an inert gas, such as argon gas, is pumped into the cleaning chamber 60 through gas inlet 200 to continuously flush the cleaning chamber 60 of contaminants and to prevent the heated wire 20 surface from oxidizing. The inert gas also provides a good ionizing medium for the arc. The inert gas is exhausted through gas outlet 210. To stabilize the arc, the hole 110 in annular arc ring is preferably conical to present a sharp edge that will concentrate the arc between wire 20 and annular arc ring 90. The conical shaped hole 110 may be formed from only one side of annular ring 90, as shown, or a pair of conical holes could be provided, one from each side, to provide a sharp edge at the substantial midpoint of the thickness of annular arc ring 90. The edge may be a sharp, knife edge, or alternatively have a small flat surface forming the inner circumference of the hole 110; i.e., a chamfered or beveled surface.

The electric arc generated between the wire 20 and annular arc ring 90 is affected by the magnetic fields established by the permanent annular magnets 80, 80*a*. A portion of the magnetic field force lines are substantially parallel to the elongated wire 20 as it passes through the wire cleaner 10. The arc current crosses these magnetic force lines at substantially right angles, and results in a Lorentz force being exerted on the arc. The Lorentz force exerted on the arc causes the arc to circumferentially rotate around the wire 20.

The wire 20 may be drawn through the wire cleaner 10 at a rate sufficient to allow the magnetic field interaction to force the arc to fully rotate around a particular section of wire 20 before that section of the wire 20 is moved past the annular arc ring 90. The electrons forming the arc carry impurities off of the outer surface of the wire 20, leaving a clean, unabraded surface suitable for use in welding or other processes. The counterflowing inert gas flushes these impurities from the central cleaning chamber 60 so as not to recontaminate the cleaned wire 20.

Figure 2:
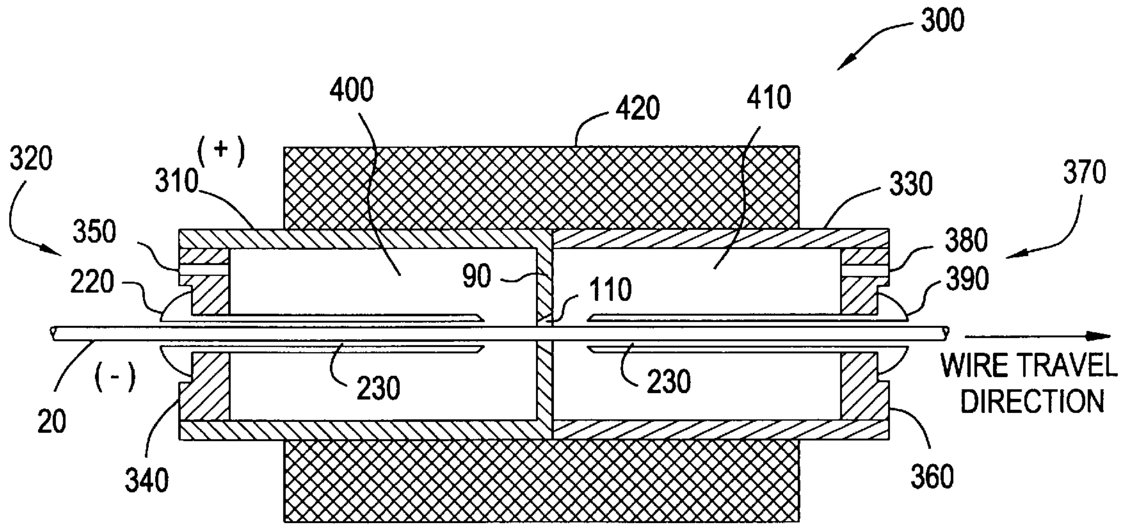
FIG. 2 is a sectional side elevation of another embodiment of the cathodic wire cleaner of the invention.

A second embodiment of the wire cleaner 5 is shown in FIG. 2. Again, functionally similar or identical components are indicated with like reference numerals. A first electrically conducting cylinder 310 having an integral annular arc ring 90 at a first end 320 is attached to a second thermally conductive cylinder 330. In contrast to the embodiment of FIG. 1, however, the electrically conducting cylinder 310 has a side cover 340 made of electrically insulating material which seals the first end opposite the integral arc ring 90. An electrically conductive wire guide 220 is again provided in side cover 340, along with an inert gas outlet 350.

The second thermally conductive cylinder 330 also has a side cover 360 made of electrically insulating material sealing a second end 370 opposite the connection to electrically conducting cylinder 310. Side cover 360 is also provided with an inert gas inlet 380, but the elongated wire 20 exits through an insulating (advantageously ceramic) wire guide 390. Thermally conductive cylinder 330 may be of any material which is a good heat conductor, while both side covers 340, 360 are also made of any electrical insulator.

Wire guides 220 and 390 support elongated wire 20 as it passes through central cleaning chambers 400, 410 defined by electrically conducting cylinder 310 and second thermally conductive cylinder 330, respectively, and their respective side covers 340 and 360. The electrically insulating, ceramic wire guide 390 prevents electric current flow in the wire within the outlet chamber 410 and prevents arcs or discharges from occurring in the outlet chamber 410. This minimizes heating of the wire 20 which could cause re-oxidation of the wire 20. During operation, the elongated wire 20 is maintained at a negative electrical potential, while the electrically conducting cylinder 310 and integral annular arc ring 90 are maintained at a positive potential. The elongated wire 20 passes through the hole 110 in annular arc ring 90 dividing chambers 400 and 410 from each other, causing an arc to form between the elongated wire 20 and integral annular arc ring 90 and clean the surface of the elongated wire 140. Dimensional relationships between the wire 20 diameter and hole 110 are maintained as before, along with other distances between components to prevent arcing at undesired locations.

As with the first embodiment, the chambers 400, 410 are continuously flushed in counterflow direction (410 first, then 400) with an inert gas such as argon during operation. As described above, the inert gas is provided at chamber 410 at gas inlet 380 and exhausted from chamber 400 at gas outlet 350.

In further contrast to the embodiment of FIG. 1, instead of permanent magnets 80, 80*a*, an electromagnet 420 surrounds the electrically conducting cylinder 310 and second thermally conductive cylinder 330. The strength of the magnetic field produced by electromagnet 420 may thus be varied to cause the Lorentz force produced during the interaction between the electrical arc and the magnetic field of the electromagnet 420 to be larger. The larger the Lorentz force, the faster the electrical arc will rotate around the wire 20, and the faster the wire 20 may be drawn through the wire cleaner 300 while still being cleaned.

In each embodiment, the length of the chambers 60, or 400, 410 may be varied to provide a longer or shorter period during which the elongated wire 20 may cool in the inert gas environment to inhibit oxidation of the cleaned surface. If the elongated wire 20 is withdrawn from chamber 60, or 410 too quickly, before the cleaned elongated wire 20 is allowed to cool to near room temperature, re-oxidation will occur when it is exposed to air.

Preferred values for the direct current (DC) voltage potential created between the elongated wire 20 and annular arc ring 90 are between about 5 and about 20 volts. A current of between about 10 and about 25 amps may be used, although both the voltage and current may be adjusted up or down to suit the particular needs of the wire 20 being cleaned, as long as an arc is formed between the wire 20 and annular arc ring 90. The inert gas flow rate may be between about 3 and about 15 cubic feet per hour ($ft^3/hr$), although other values are also acceptable.

Further, while specific materials have been specified for certain elements of the invention, it should be noted that any known equivalent electrically conductive or insulating materials may be substituted for the indicated materials (as the case may be) described above. Thus, while specific embodiments of the invention have been shown and described in detail to illustrate the application of the principles of the invention, it will be understood that the invention may be embodied otherwise without departing from such principles.

I claim:

1. A cathodic wire cleaner for removing impurities from an elongated wire surface, the wire cleaner comprising:

an elongated housing defining a chamber and having a first end and a second end;

an annular arc ring positioned in the chamber between the first and second ends of the housing having a central hole through which the elongated wire travels as it is being cleaned;

a pair of annular permanent magnets, one located on either side of the annular arc ring such that central apertures of each of the magnets are coaxially aligned with the central hole in the annular arc ring;

wire guide means for guiding the elongated wire into the first and out of the second ends of the chamber such that the wire passes through the annular permanent magnets and the annular arc ring therebetween, said wire guide means supporting the elongated wire for a portion of the length of the central apertures of the magnets;

means for purging the chamber with an inert gas; and means for applying a negative electrical potential to the elongated wire relative to a positive electrical potential of the annular arc ring, such that when the wire is guided through the chamber, an electrical arc discharge occurs between the wire and arc ring, and the arc discharge is forced to rotate around the wire by a magnetic field produced by the pair of annular permanent magnets, thereby cleaning the wire.

2. The cathodic wire cleaner according to claim 1, wherein the chamber is substantially cylindrical.

3. The cathodic wire cleaner according to claim 1, wherein the pair of annular permanent magnets are arranged on either side of the annular arc ring such that a N pole of one magnet is adjacent a S pole of the other magnet.

4. The cathodic wire cleaner according to claim 1, further comprising insulating means for electrically isolating the pair of annular permanent magnets from the housing and the annular arc ring.

5. The cathodic wire cleaner according to claim 1, wherein the annular arc ring is integrally formed with the housing.

6. A cathodic wire cleaner for removing impurities from an elongated wire surface, the wire cleaner comprising:

a first elongated housing having first and second ends defining a first chamber, the second end of the first housing having an integral annular arc ring connected thereto and having a central hole;

a second elongated housing having third and fourth ends, the third end attached to the annular arc ring, the second housing defining a second chamber;

wire guide means for guiding the wire through each of the first chamber, the annular arc ring, and the second chamber, said wire guide means supporting the elongated wire as it passes through the first and second chambers;

purge means for providing and removing an inert purge gas to each of the first and second chambers;

magnet means surrounding at least a part of each of the first and second housings for producing a magnetic field that is substantially parallel to the wire when it is within the annular arc ring; and means for applying a negative electrical potential to the wire with respect to a positive electrical potential of the annular arc ring, such that when the negative electrical potential is applied to the wire and the wire is guided through the annular arc ring, an electrical arc discharge is produced between the wire and the annular arc ring, and the arc discharge is forced to rotate about the wire by the magnetic field, thereby cleaning the wire.

7. The cathodic wire cleaner according to claim 6, wherein the magnet means comprises an electromagnet.

8. The cathodic wire cleaner according to claim 6, wherein the first elongated housing comprises an electrical conductor.

9. The cathodic wire cleaner according to claim 6, wherein the second elongated housing comprises a thermal conductor.

10. The cathodic wire cleaner according to claim 6, wherein each of the first and second housings and the magnet means are substantially cylindrical in shape.

11. The cathodic wire cleaner according to claim 6, wherein the guide means comprises a pair of elongate bolts each having a hole therethrough, one bolt extending through the first end and the other extending through the fourth end, the holes in each of the bolts being substantially coaxially aligned with the hole in the annular arc ring and extending theretowards, such that when the wire extends through each bolt and through the hole in the annular arc ring, the wire is exposed when it is within the annular arc ring.

* * * * *